United States Patent [19]

Livingston

[11] Patent Number: 5,479,739
[45] Date of Patent: Jan. 2, 1996

[54] SPRING ACTUATED MARINE ANIMAL CAPTURING DEVICE

[76] Inventor: J. Mark Livingston, 1931 NW. 18th St., Crystal River, Fla. 34428

[21] Appl. No.: 298,569

[22] Filed: Aug. 31, 1994

[51] Int. Cl.⁶ .................................................. A01K 77/00
[52] U.S. Cl. ............................................................. 43/12
[58] Field of Search ............................ 43/12, 11, 1, 134, 43/135, 5, 7

[56] References Cited

U.S. PATENT DOCUMENTS

| | | |
|---|---|---|
| 3,833,252 | 9/1974 | Redding ....................................... 43/5 X |
| 4,492,052 | 1/1985 | Davis ............................................ 43/12 |
| 4,706,404 | 11/1987 | Kun ............................................. 43/12 |

FOREIGN PATENT DOCUMENTS 55147  6/1951  France ......................................... 43/12

*Primary Examiner*—P. Austin Bradley
*Assistant Examiner*—Jeanne M. Elpel
*Attorney, Agent, or Firm*—Dominik & Stein

[57] ABSTRACT

A spring powered capture device of a type having a frame, a flexible container suspended from the frame, and a handle attached to the frame. The frame is provided in two parts which are capable of folding together to trap contents within the container. Spring means are preferably provided for biasing the frame parts from an open to a closed, folded position. The device is particularly suitable for use by sport divers for capturing lobster.

3 Claims, 3 Drawing Sheets

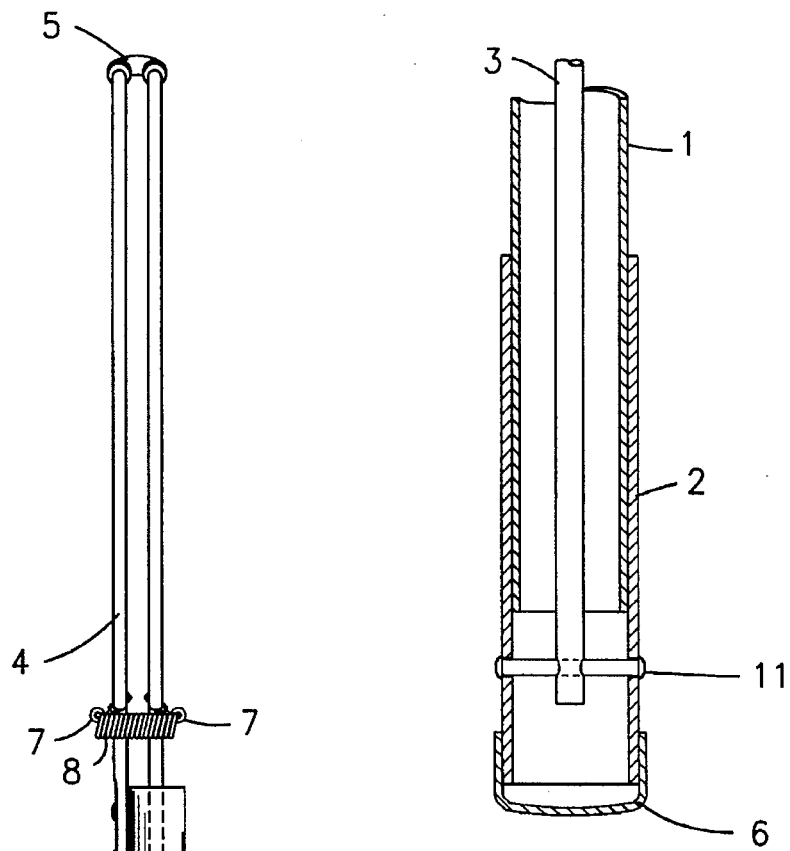
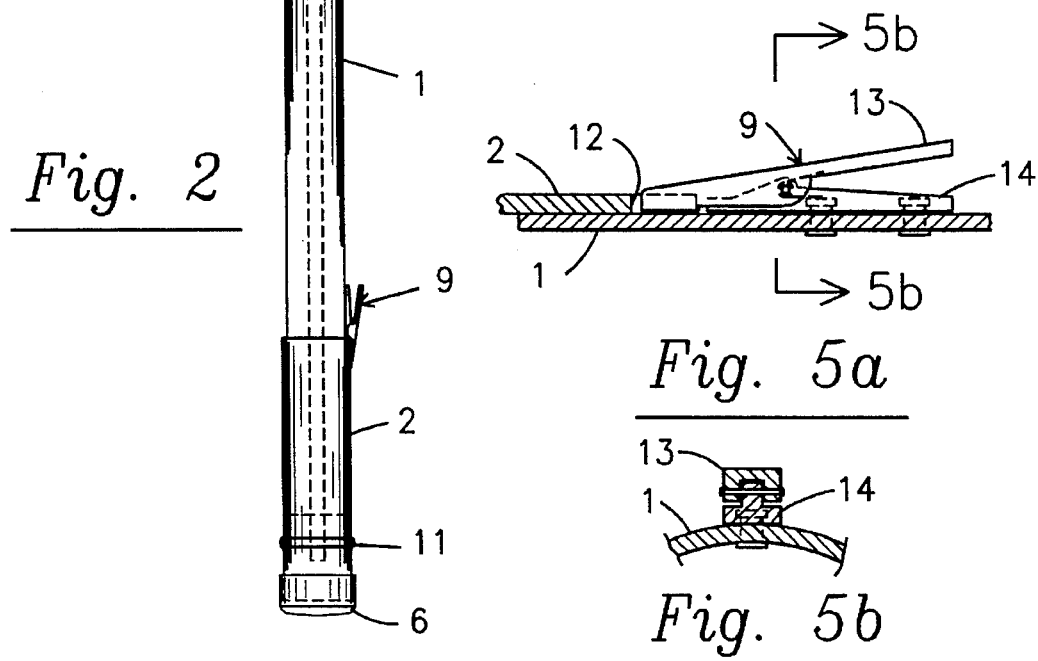

SPRING ACTUATED MARINE ANIMAL CAPTURING DEVICE

BACKGROUND OF THE INVENTION

1. Field of the Invention

The present invention relates broadly to a spring powered capture device of a type having a frame, a flexible container suspended from the frame, and a handle attached to the frame. In a preferred embodiment, the frame is provided in two parts which are folding together to trap contents within the container.

2. Description of the Related Art

Although lobster vary greatly around the world, they share one common characteristic—a well developed delicious tail muscle. Lobstering is a popular activity among sport divers. American lobster can be found in and around wrecks in the Atlantic and Pacific and on reefs and in crevices or potholes in the Gulf of Mexico. The popular northern Maine lobster is characterized by two large front claws, one crusher claw and one ripper claw. As the names may suggest, these claws present a danger to divers, and large lobster have been known to break fingers, even where the diver is wearing protective gloves. The Florida spiny lobster, in contrast, does not have such large claws, but is covered with sharp projections on the carapace (particularly over the eyes), the antennae, and parts of the tail. These projections protect the lobster against predatory fish, and can easily cut the hand of a diver attempting to grab such a lobster. Many divers facing a lobster underwater find the prospect of grabbing a live lobster by hand to be an intimidating experience.

In order to reduce the risk of injury to divers, various lobster snaring or capturing devices have been developed. Perhaps the most popular of these devices consists of a hollow pipe having a wire passing through the pipe, the wire having a loop on one end and a handle on the other end. The loop is passed over the lobster and the handle is pulled so that the loop, while being drawn into the pipe, closes tightly around the lobster. However, an alerted lobster can rapidly propel itself away, and it requires skill to snare a lobster using such a device.

Another popular method for capturing lobster is to use a tickle stick to maneuver the animal from its habitat, and then to lower a net over the lobster. The net is usually a fixed-rim net including a rim to which the net is fixed and a handle to which the rim is fixed. A lobster trapped under such a net will attempt to escape. If the bottom contour is irregular, such as in a reef or rocky bottom, openings will be formed between the rim of the net and the ocean floor, and the lobsters may escape before the diver has a chance to grab the lobster. Further, if the net is not placed completely over and around the lobster, so that part of the lobster protrudes from the net, the lobster may be able to work itself free. Even if the bottom is flat and the rim of the net can be placed flush against the floor to prevent escape of the lobster, the diver must then grab the lobster in the net to secure the lobster, and then remove the lobster from the net and transfer it to a lobster catch bag. The danger to the hand of the diver remains. Further, such a net is bulky and is difficult to carry underwater along with the many pieces of equipment worn by the diver. This problem remains even out of the water, where such a net can get entangled with the equipment of fellow divers on a dive boat. A further disadvantage with such a net is that it requires a large storage space when not in use.

A wide variety of nets have been developed in the past for capturing various creatures such as fish, insects, and land animals as well as crustaceans including crabs and lobster.

U.S. Pat. No. 2,653,403 (Oslund) teaches a fish net having fish netting suspended from a frame. A complex mechanism is provided for closing the normally open top of the fish net by gathering the net at one side of the frame, thereby preventing the escape of fish gathered in the net.

U.S. Pat. No. 2,409,146 (Motel) teaches a shutter mechanism incorporated in the webbing of the net for closing the net.

U.S. Pat. No. 4,272,906 (Liebling) discloses a fish net comprising a frame, a container mounted on the frame and defining an opening for the entry of fish, and cover means slidably supported by the frame for movement between a retracted and an extended position. Such a net would be impossible to use underwater due to the large surface area which translates to large water resistance. Further, the trapping of a lobster with such a net would be virtually impossible considering the rapid reflexes of the lobster in relation to the slow movement and small size of the net. Finally, the removal of a lobster from such a net would be difficult.

A further representative net can be found in U.S. Pat. No. 5,276,995 (Johnson). A net is attached to a frame and a bar, the bar being slidably attached to the frame. Release means are provided to hold the net in the open position, and elastic means are provided to urge the net to close when the release means are activated. However, this net design requires the creature to pass through the rim of the net before the release means can be operated. A further problem with a net of this design is that the bar must travel through the area where the lobster will be. Further, if the net is made of a flexible material which will sink in water, the net will tend to collapse downward. This may not be a problem where the net is used to scoop in an upward direction as when capturing a fish. However, lobster are to be found on the ocean floor, and a dangling net will alert a lobster.

Thus, while a wide variety of nets are known for capturing of fish or insects, none is particularly adapted to capturing lobster.

In view of the foregoing, it is an object of the present invention to provide a net which can be used for capturing lobster which eliminates or minimizes the above-mentioned and other problems, limitations and disadvantages typically associated with conventional nets and traps, and to provide a lobster net which enhances the success rate of capturing lobster, has an attractive appearance, and is easy and fun to use, yet does not unduly interfere with the diver while diving, is light, simple to manufacture, inexpensive to maintain, reliable, and can be made compact for storage.

SUMMARY OF THE INVENTION

After extensive investigation and experimentation, the present inventor has discovered that the objects of the invention can be simply, eloquently, and inexpensively accomplished by a device comprising a tubular handle, a control shaft extending through said hollow handle and free to rotate with respect to said handle, a frame defining an aperture, said frame divided into a first frame member and a second frame member, the first frame member connected to the tubular handle, the second frame member connected to the control shaft, said frame members being capable of being moved between an open and a closed position with respect to each other by the rotation of said control shaft in said tubular handle, and a flexible container suspended from said frame.

More preferably, the capture device is a spring powered capture device, comprising:

a tubular handle having a distal end and a proximal end;

a frame defining an aperture and comprising at least first and second rigid frame members flexibly connected to each other and capable of folding from an open to a closed position, said first frame member being fixedly attached to the distal end of said handle, said second frame member including a shaft extending through the handle, said shaft being free to rotate within said handle, a flexible container suspended from said frame members, a control sleeve provided at the proximal end of said handle, fixedly connected to the shaft of said second frame member and free to rotate with respect to said handle, elastic means connected to at least one of said frame members for urging the frame member to a closed position.

In an even more preferred embodiment, the capture device is a spring powered capture device including detent means for detaining the frame in the open position until said detent means is released.

The capture device according to the present invention represents a significant advantage over conventional capturing devices in that the prey can be quickly and easily captured in almost any terrain and the container can be closed about the lobster, all with a single hand.

A further advantage of the capture device according to the present invention is that the net closes downward in a "venus fly-trap" motion to capture the prey even when the frame of the net is not completely lowered over the creature for capture.

Yet a further advantage of the invention is the elimination of the requirement for a flat surface against which to press the net frame to capture the creature. The frame members which make up the frame according to the present invention scoop down and around the creature and quickly enclose the creature, so that even if the creature is on a rocky bottom or other uneven terrain, capture is virtually assured.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other capturing devices for carrying out the same purposes of the present invention. It should also be realized by those skilled in the art that such equivalent structures do not depart from the spirit and scope of the invention as set forth in the appended claims.

BRIEF DESCRIPTION OF THE DRAWING

For a fuller understanding of the nature and objects of the present invention reference should be made the following detailed description taken in with the accompanying drawings in which:

FIG. 2 is a front view of the net in the closed position, FIG. 4 is a cross-sectional view of the handle and handle sleeve area, and FIGS. 5(a–b) are cross section views of a locking mechanism.

DETAILED DESCRIPTION OF THE INVENTION

Figure 1:
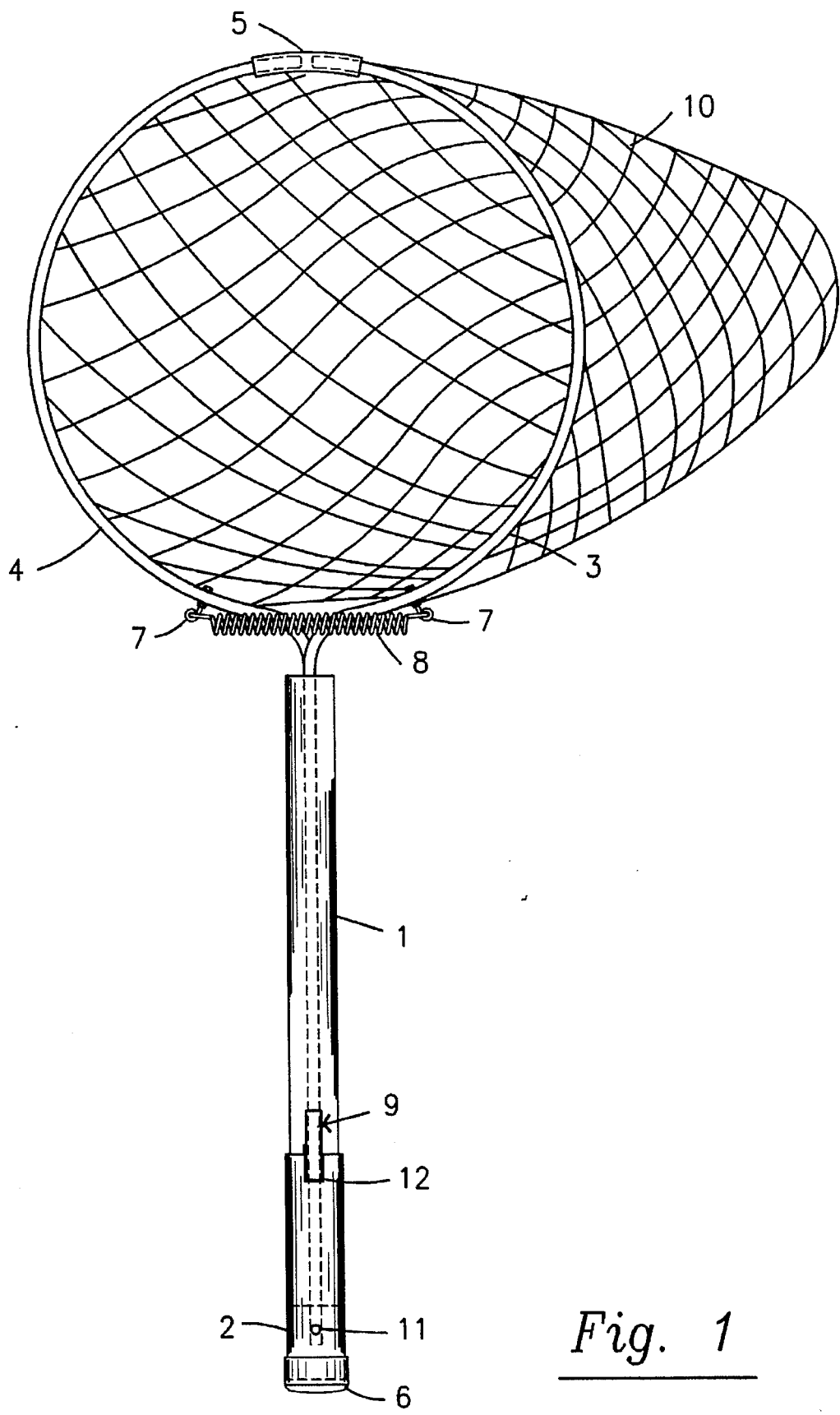
FIG. 1 is an elevated perspective view of the capturing device in the open position.
Figure 3:
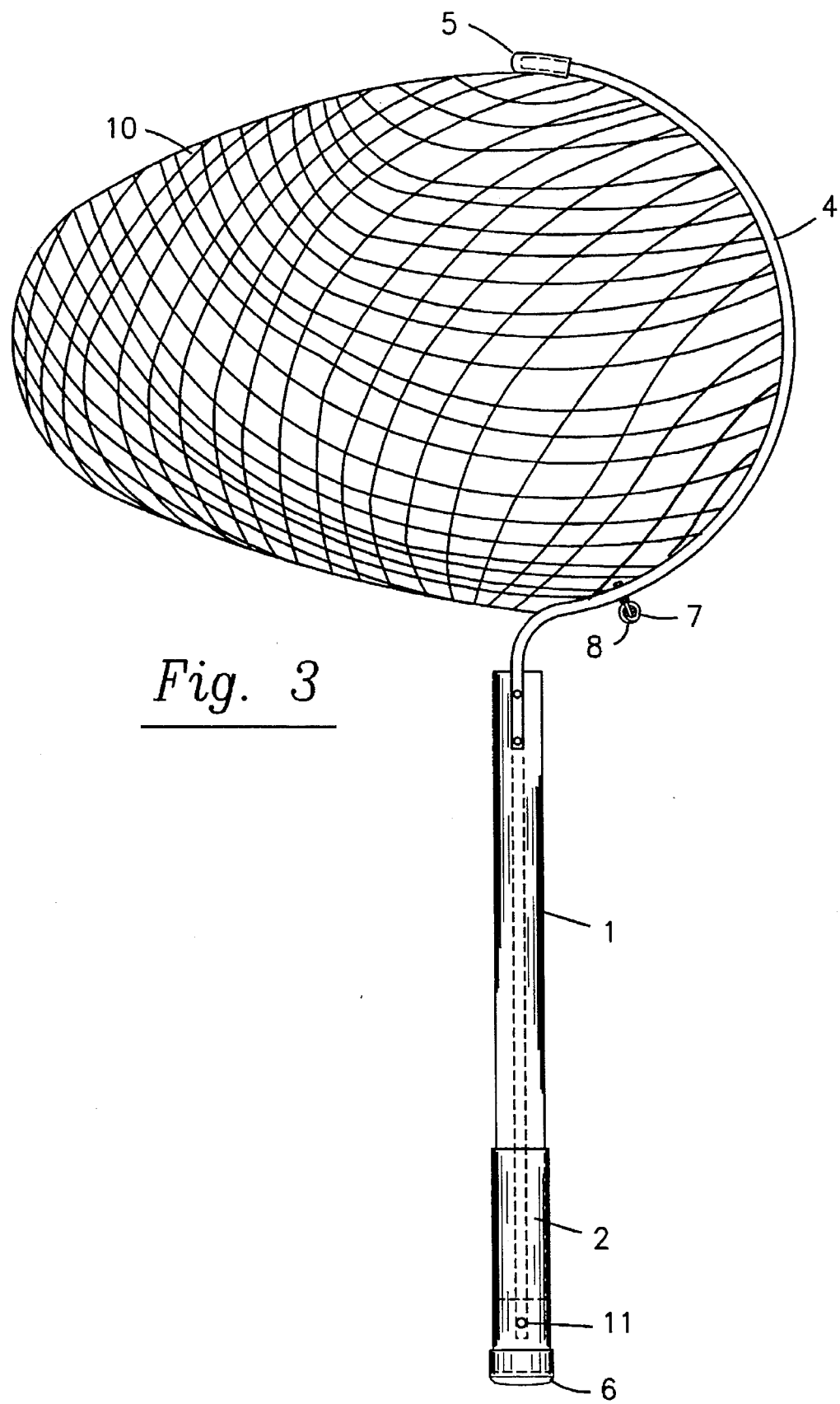
FIG. 3 is a side view of the net in the closed position.

The present invention more specifically concerns an improved capturing device of a type particularly suitable for capture of lobster.

The container in which the lobster may be captured may be any type of container, so long as the material in the area of the frame is sufficiently flexible to permit closure. The container may be, for example, a plastic bag, a fine mesh cloth or nylon bag, or a large mesh bag, and is preferably a bag of the type available in dive stores and known as a "goody bag". The design of the capturing device of the invention can be easily adapted to the various net or container configurations and fabrication technologies utilized in the field today. However, the precise construction of the container is not central to the invention, and any container or net designed for long life, high visibility, and minimal snagging would be preferred.

The tubular handle is provided for the purpose of extending the reach of the diver. The tubular handle has a proximal end for grasping and for the control mechanism, and a distal end for the capturing container, the frame from which the container is suspended, and optionally spring powered closure means. The tubular handle may be formed of any material which is sufficiently strong and salt-water resistant for the intended use, such aluminum or polyvinyl chloride tubing.

The container or net is suspended from a frame which defines the aperture. The aperture may be circular, oval, square, rectangular, or any desired shape. A circular shape has been found to work well. The frame is composed of first and second frame members. The first frame member is rigidly (i.e., non-rotatingly) fixed to the distal end of the handle, and defines one-half the aperture. The other frame member defines the other half of the aperture and is fixedly attached to a shaft, or includes a shaft, which shaft is inserted down the axis of the handle and connects at the proximal opening of the tubular handle to a control element such as a control sleeve. The control sleeve can be used to control the rotation of the second frame member.

The two frame members flexibly connect with each other at a point which is preferably 6 to 24 inches from the distal end of the handle, preferably about 18 inches along an imaginary line extending along the axis of the handle beyond the distal end of the handle. This way, the two frame members pivot with respect to each other about the axis of the handle. The two frame members may be connected by small loops or eyelets oriented 180° out of rotation. However, to insure quietness of operation, and for reasons of ease of construction and repair, it is preferred that the first and second frame members be connected to each other by means of a hinge forming member such as a segment of a tubular plastic or rubber material, such as surgical hose having an inner diameter for sliding tightly over frame members. It is also possible for the net to be so constructed as to include pockets into which to insert the frame members, so that the net itself serves as the hinge forming member.

The shaft is connected at the proximal end to a control element so that the pivoting of the second frame member can be controlled from the proximal end of the handle. The control element may be a knob provided at the terminus of the tubular handle, or a lever extending radially outward from the end of the tubular handle. For reasons of compactness and for reduced snagging, it is preferred that the control element be a generally tubular segment coaxial with the tubular handle. In one embodiment the control element is the same shape and diameter as the tubular handle, and is connected to a shaft which fits inside said tubular handle with close tolerance. In a more preferred embodiment, the control element has an inner diameter which is slightly larger than the outer diameter of the tubular shaft, so that it fits over the tube shaft to form a control sleeve and is free to rotate. The control sleeve is connected to the control shaft. The diver can hold the tube handle with one hand, the control shaft with the other hand, and by rotating one with respect to the other, can control the opening and closing of the frame members and thus the opening and closing of the container (e.g., net).

As an alternative, the handle tube can have an internal diameter of e.g., about one inch. A control shaft of about one inch diameter (yet smaller than the handle tube) can be connected at the distal end to the second frame. The proximal end of the control shaft can simply extend about six inches beyond the proximal end of the tube shaft, providing a gripping surface as the control element. In this way, the construction of a separate control sleeve, control shaft, and connecting means can be eliminated.

The capture device can be closed manually without resort to any elastic closing means. However, in the underwater environment one-handed operation is preferred, and thus the net according to the present invention is preferably provided with elastic closing means. It is preferred that a spring or elastomeric material be provided as the motive force to bring the frames together to a closed position. The term "spring" as used herein is intended to mean any elastic body or device that recovers its original shape when released after being distorted. The spring means may be connected at one end to the second frame member, the control sleeve or the shaft, and at the other end to the first frame or the tubular handle. It is merely necessary that the spring means be provided in such a manner that the opening of the net causes stretching or distorting of the spring so that the tendency of the spring to return to the starting shape provides the motive force for urging the net to close.

Of course, it is possible to replace the spring means with pneumatic or electro-mechanical net closure means; however, in order to minimize cost and weight, spring means are preferred.

A preferred embodiment of the invention will now be discussed by reference to the accompanying drawings, in which FIG. 1 is a view of the capture device with the net in the open position. Net 10 is attached to frame members 3 and 4 which are connected to each other via connecting member 5. Connecting member 5 may be any hinge-forming member, but for ease of construction and repair, and for resistance to salt water, it is preferred that the hinge forming member be a segment of a tubular plastic or rubber material, such as surgical hose, of an inner diameter for sliding tightly over frame members 3 and 4.

The proximal end of the first frame member 4 is rigidly attached to the distal end of handle 1, such that the distal end of frame member 4 touches or nearly touches an imaginary line extending out along the axis of handle 1. Second frame member 3 preferably symmetrically complements frame member 4 to form an aperture which can be folded between an open position and a closed position. Frame member 3 may be attached to a shaft which extends through the tubular handle 1, but for ease of manufacture and assembly, it is preferred that the second frame member 3 and shaft are formed as a single piece from a single elongated element such as an aluminum rod. Frame members 3 and 4 may be formed of any material which, when used in sea water, is resistant to sea water.

The shaft extends inside along the axial length of tubular handle 1 and attaches to control sleeve 2. Control sleeve 2 may be capped with an end member 6. The connection between the shaft and control sleeve 2 may be through the hole at the proximal end of the tubular handle, or through a separate slot machined into the side of the tubular shaft. The control sleeve 2 as shown in FIGS. 1–4 has an inner diameter for sliding over the outside diameter of the handle 1 and is attached to the extension of frame member 3 with a pin 11. This attachment means additionally holds the control sleeve 2 on the end of handle 1.

Attachment means such as eye bolts 7 are provided on frame members 3 and 4 close to handle 1. The eye bolts project radially from frame members 3 and 4. Each end of the spring member 8 is then attached to one of the eye bolts.

The spring powered capturing device is preferably provided with a detent or locking mechanism 9 which may be any mechanical means capable of arresting the rotational force of the spring loaded capture device in the open position, such as a tab attached to the outside diameter of the handle 1 which toggles to engage a slot in the control sleeve 2 when the net is in the open position in order to prevent rotation of frame member 3 and net closure. A detailed view of a possible locking mechanism 9 is shown in FIGS. 5(a–b), comprising lever 13 and mount 14, with lever 13 in the closed detent or resting position, indicating that the capture device is "armed". Upon finding a lobster, the net is brought over the lobster and lever 13 is depressed (or, alternatively, slid longitudinally out of said notch 12), so that handle 2 and thus spring member 8 is no longer restrained and the two frame members can quickly close over or "snatch" the lobster. The locking mechanism may be held in place by frictional forces (preferred in a sliding locking mechanism) or by additional spring means, such as in a "clothespin" design (preferred in a toggle or lever design).

In an alternative embodiment of the invention, the control sleeve is provided near the center of the tubular handle, so that during operation the hand is actually grasping the tubular handle. The advantage of this design is the ability to grasp the most proximal end of the handle without interfering with the rotating closure action of the second frame member 3 and associated control element 2.

In order to operate the capturing device according to the invention, the operator grasps both the tubular net handle 1 and control sleeve 2. The operator then rotates the control sleeve 2 180° relative to handle 1. This rotation causes the second frame member 3 to move the same amount of degrees, so that the two frame members are on a plane 180° out of rotation and define an aperture. At this point the slot in the control sleeve 2 is aligned with the locking mechanism 9. Locking mechanism 9 engages with the control sleeve 2 thus holding the frame members 3 and 4 in the open position with a potential motive force for closure created by the deforming of spring member 8.

The net is ready to be closed by displacing the locking mechanism 9 which allows the control sleeve 2 and second frame member 3 to return the 180° previously rotated during opening. During closure the operator is grasping the handle 1 while allowing the control sleeve 2 to rotate within the operators palm. Alternatively, the operator grasps control element 2 allowing handle 1 and the first closure element 4 to rotate.

Many variations on this basic design are possible while retaining the essence of the invention.

In another embodiment, which may be referred to as a "pistol grip" embodiment, the tubular handle is provided with a first grip part which is fixedly connected to the proximal end of the tubular handle and a second grip part mounted pivotally about a pivot axis which pivot axis is perpendicular to the tubular handle, the second grip part being connected to an elongated operational element slidably disposed in said tubular handle for conveying operational forces from said second grip part to the second frame member in such a manner that upon applying pressure to the second grip part the elongated operational element is axially displaced in said tubular shaft causing the second frame member to pivot between the opened and closed positions.

In a yet further embodiment of the invention, the spring is a metal coil spring provided helically inside the tubular handle between the handle and the shaft, so that rotating the control element causes tightening of the metal coil.

In another embodiment, the shaft inside the tubular handle is provided on one end with the second frame member and on the other end with a solid metallic loop having a diameter of approximately four inches. This loop can be used to control the second frame member, and can also be used for attaching the capturing device to the diver in transport and for hanging up the net when not in use. This loop is preferably provided such that the loop and the closed frame are on the same plane.

In another embodiment, the frames are provided with finger-like projections so that the capture net takes the shape of a venus fly-trap. However, for underwater use, the basic frame design has proven satisfactory.

Although the system was first designed for providing a device for assisting with the capturing of lobster, and thus is particularly suited for capturing underwater animals such as tropical fish, crabs, lobster, etc., it will be readily apparent that the device is capable of being adapted to the capture of various animals such as land based insects, birds, and to other applications. Although this invention has been described in its preferred form with a certain degree of particularity with respect to the capturing of lobster, it is understood that the present disclosure of the preferred form has been made only by way of example and that numerous changes in the details of structures and the composition of the device may be resorted to without departing from the spirit and scope of the invention.

Now that the invention has been described,
What is claimed is:

1. A capturing device comprising:

a hollow tubular handle having a proximal end and a distal end;

a control shaft coaxial with and extending internally through said hollow tubular handle and free to rotate with respect to said handle;

a frame defining an aperture when in the open position, said frame comprising a first frame member and a second frame member, said first frame member connected to said distal end of said tubular handle, said second frame member connected to said control shaft, said first and second frame members being capable of being folded with respect to each other between an open and a closed position about an axis defined by said handle by the rotation of said control shaft within said tubular handle;

a container suspended from said frame members, said container being sufficiently flexible to permit said frame members to travel between open and closed positions; and means connected to said shaft which can be grasped by hand for rotating said shaft with respect to said handle;

and further comprising elastic means connected to at least one of said frame members for urging said frame members from an open to a closed position with respect to each other.

2. A capturing device as in claim 1, wherein said first and second frame members are each provided with projecting attachment means for attachment of said elastic means.

3. A capturing device comprising:

a hollow tubular handle having a proximal end and a distal end;

a control shaft coaxial with and extending internally through said hollow tubular handle and free to rotate with respect to said handle;

a frame defining an aperture when in the open position, said frame comprising a first frame member and a second frame member, said frame members having distal ends, said first frame member connected to said distal end of said tubular handle, said second frame member connected to said control shaft, said first and second frame members being capable of being folded with respect to each other between an open and a closed position about an axis defined by said handle by the rotation of said control shaft within said tubular handle; and a container suspended from said frame members, said container being sufficiently flexible to permit said frame members to travel between open and closed positions, wherein the distal ends of said frame members are connected to each other by means of an elastic flexible tubular connecting member which slides over one distal end of each of the frames members to form a hinge connection.

* * * * *